Patented July 31, 1945

2,380,489

UNITED STATES PATENT OFFICE 2,380,489

HYDROCARBON CONVERSION PROCESS

James C. Bailie, Chicago, Ill., assignor to Standard Oil Company, Chicago, Ill., a corporation of Indiana No Drawing. Application December 31, 1941, Serial No. 425,141

11 Claims. (Cl. 196—52)

This invention is related to a process of converting hydrocarbon oils wherein highly heated vapors of the oils are passed in contact with a catalyst which accelerates the conversion, and to a catalyst for said conversion. The process may be applied to the conversion into gasoline of heavy oils, such as gas oil, or it may suitably be applied to the conversion or reforming of gasoline and gasoline fractions, e. g., heavy naphtha, to increase the knock rating. When the process is used for reforming gasoline, a higher temperature is ordinarily employed, than for cracking.

One of the objects of my process is to convert hydrocarbon oils into high knock rating gasoline by the use of a catalyst which may be employed for a relatively long time before regeneration is necessary. Another object of my invention is to provide a process for catalytic cracking or reforming, in which the production of carbon and carbonaceous material is relatively small, thus reducing the loss of oil as represented by carbonaceous products of negligible value and facilitate the regeneration of the catalyst by burning. A further object of my invention is to obtain a better product distribution. Yet another object is to provide a catalyst resistant to high temperature.

The material which I employ as catalyst in my process is aluminum fluosilicate, the chemical formula of which is approximately $Al_2(SiF_6)_3$, particularly in combination with magnesium oxide. This compound may be made by treating aluminum oxide, or better aluminum hydroxide, with fluosilicic acid, or alternatively, an aluminum salt, e. g., aluminum sulfate may be treated with sodium fluosilicate or other soluble fluosilicate to form the desired product. The aluminum fluosilicate produced in this manner is an insoluble powder which may be filtered from the reaction mixture and pressed, molded or extruded into pellets or other form presenting a large surface for use in the cracking operation.

Various other methods may be employed for making the aluminum fluosilicate catalyst, for example, aluminum fluoride may be caused to react with silicon tetrafluoride, viz:

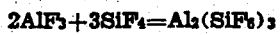

I may employ this method in preparing the catalyst in situ. Thus, I may dispose aluminum fluoride in the reaction zone of my cracking process and then introduce silicon tetrafluoride gas, permitting the catalyst to be formed on the surface of the material in the reaction zone. I may use various supports or so-called carriers for my catalyst such as silica sand, silica gel, charcoal, bauxite, alumina gel, kieselguhr, fuller's earth, etc. and the catalyst may be deposited on the surface of the carrier by the wet method or by the method just described, or the aluminum fluosilicate may be milled or mixed intimately with the carrier or other ingredient.

I may employ aluminum fluosilicate as an addition agent with other hydrocarbon conversion catalysts. For example, I may mix a minor proportion of aluminum fluosilicate with activated clay such as Super Filtrol, with silica gel and with various metal oxides such as aluminum oxide, magnesium oxide, titanium oxide and aluminum or magnesium oxide in combination with active silica. In preparing these combination catalysts, the aluminum fluosilicate is preferably added to the catalyst in amounts of about 1 to 10% or as much as 20 to 50%. The aluminum fluosilicate promoter has been found to increase the activity of the catalyst to which it is added and also reduce the formation of fixed gases and carbon.

In carrying out my process, I prefer to employ completely vaporizable oils or so-called clean cracking stocks such as gas oil, kerosene or heavy naphtha. In the case of gas oil, I prefer to vaporize the oil at a temperature of about 800 to 1025° F., for example 925° F., and conduct the hot vapors through the catalyst disposed in a porous bed. The catalyst may be retained in a restricted zone provided with suitable temperature control means in order to regulate the temperature of the vapors undergoing conversion or the catalyst may be suspended as a powder in the oil vapors.

The conversion reaction is usually endothermic and requires the introduction of additional heat. In the case of heavy naphtha conversion, I may employ somewhat higher temperatures, e. g., 850 to 1100° F. for example 1000° F. Hydrogen may also be present—generally in an amount of about 1 to 4 volumes per volume of naphtha vapor treated. In general, I prefer to conduct the conversion operation at relatively low pressures, for example, 5 to 50 pounds per square inch, although higher pressures may be employed if desired such as 100 to 500 pounds per square inch, especially in the case of reforming. The time of contact of the hydrocarbon vapors with the catalyst expressed as space velocity is usually about 0.2 to 10 volumes of liquid oil per volume of catalyst per hour. A space velocity within the range of about 0.3 to 5 volumes of liquid hydrocarbon charged per gross volume of catalyst per hour is typical.

After the hydrocarbon vapors have contacted the catalyst they are passed to a suitable fractionating apparatus where the gasoline is separated from the heavy hydrocarbons and the latter may be recycled to the conversion process except in the case of gasoline reforming, in which case the process is best operated on the "once through" basis. The gasoline fraction is separated from undesirable fixed gases such as propane and, if desired, the gases, especially hydrogen-containing gases, may be recycled also to the conversion process.

The following data will illustrate the results obtained in one run with my aluminum fluosilicate catalyst. The oil treated was 35° A. P. I. Mid-Continent gas oil.

| Catalyst | $Al_2(SiF_6)_3$ Run 1 | Run 2 |
|---|---|---|
| Weight of catalyst, gms. | 57.7 | |
| Vol. of catalyst space, c. c. | 117.0 | |
| Cracking temperature, °F | 925.0 | 925.0 |
| Pressure | Atmospheric | |
| Feed rate c. c. per hour | 141.0 | |
| Vol. of feed per vol. of catalyst chamber per hour | 1.20 | |
| Bbls. (42 gals.) feed per ton of catalyst | 13.9 | |
| Time of contact, secs. | 8.6 | 9.8 |
| Length of run, hours | 6.02 | 5.5 |
| Recovery, wt. per cent of feed | 98.2 | |
| Once through yields: | | |
| Dry gas, wt. per cent | 1.43 | 1.61 |
| Gasoline, vol. per cent | 9.07 | 8.8 |
| Cycle stock, vol. per cent | 87.7 | |
| Gasoline produced per hour | 12.8 | |
| Gas, lbs. per gal. of gasoline | 1.11 | |
| Gas, cu. ft. per gal. of gasoline | 17.1 | |
| Specific gravity dry gas (air=1) | .86 | |
| Gasoline, end point | 400+4° | |
| Gravity, °A. P. I. | 55.9 | |
| Knock rating, A. S. T. M. (from blends) | 84.4 | 77.0 |
| Unsaturates, per cent | 70.5 | 88.3 |
| Refractive index | 1.4298 | |
| Cycle gas oil—end point, °F | 716 | |
| Gravity, °A. P. I. | 35.6 | |
| 50% point (A. S. T. M. distillation) | 562 | |
| Unsaturates, per cent | 19.3 | |
| Refractive index | 1.4718 | |

One of the outstanding characteristics of my new hydrocarbon conversion catalyst is the negligible amount of carbonaceous deposit which forms on the catalyst. In Run 2 above, the carbon formed on the catalyst was only .03%. Accordingly, with this catalyst it is possible to make longer runs with less frequent shutdowns for regeneration of the catalyst. Regeneration is usually accomplished by burning the carbon from the catalyst with a regulated stream of air and inert gas and regeneration may be repeated many times before it is necessary to remove the catalyst from the conversion zone and replace with new catalyst.

The following is an example showing the beneficial effect of aluminum fluosilicate added to another catalyst, in this case Super Filtrol, an acid activated montmorillonite clay. Ten percent (10%) of the aluminum fluosilicate was mixed thoroughly with the Super Filtrol and molded into pellets. Mid-Continent gas oil was subjected to cracking by passing the vapors at the temperature of 925° F. over Super Filtrol in one case and in the other case Super Filtrol promoted with 10% of aluminum fluosilicate. The results are as follows:

| | Run No. | | |
|---|---|---|---|
| | 1 | 2 | 3 |
| | Catalyst | | |
| | Super Filtrol clay alone | Super Filtrol clay+10% $Al_2(SiF_6)_3$ | Regenerated from #2 |
| Space velocity | 0.97 | 1.12 | 0.90 |
| Length run, hours | 5.5 | 5.5 | 5.5 |
| Gasoline, percent by volume | 24.7 | 26.7 | 29.5 |
| Dry gas, percent by weight | 3.9 | 3.7 | 3.6 |
| Gas, lbs. per gal. of gasoline | 1.12 | 0.96 | 0.86 |
| Knock rating, A. S. T. M. | 80.5 | 81.5 | |

It will be noted from these data that the catalyst promoted with aluminum fluosilicate produced more gasoline and less gas as indicated by the gas to gasoline ratio. The improvement in the knock rating is also significant.

In another example, gas oil of 35.5° A. P. I. was cracked to about the same gasoline yield using three different catalysts and the carbon formation was found to be very much less with the aluminum fluosilicate catalyst. The data follow:

| | Run No. | | |
|---|---|---|---|
| | 1 | 2 | 3 |
| | Catalyst | | |
| | Silica gel +20% $Al_2(SiF_6)_3$ | Silica gel +about 2% $Al_2O_3$ | Super Filtrol |
| Gasoline, vol. percent | 36.8 | 35.7 | 35.0 |
| Carbon, wt. percent | 0.8 | 1.8 | 1.2 |
| Knock rating, A. S. T. M. | 79.8 | 80.0 | 79.0 |

The following data illustrate still further the low carbon forming tendency of fluosilicate treated catalysts. Mid-Continent gas oil of 35.5° A. P. I. was cracked for 2-hour reaction periods at a space velocity of 1. The results follow:

| | Catalyst | | | |
|---|---|---|---|---|
| | Silica hydrogel+7.9 alumina | | Silica hydrogel+3.3% alumina+ 7.5% $Al_2(SiF_6)_3$ | |
| Temperature, °F | 925 | 850 | 925 | 850 |
| Gasoline, vol. per cent | 36.4 | 39.7 | 38.4 | 37.9 |
| Excess butane, vol. per cent | 16.9 | 6.5 | 13.8 | 7.6 |
| Dry gas, wt. per cent | 13.9 | 4.3 | 11.7 | 4.3 |
| Carbon, wt. per cent | 3.9 | 2.4 | 3.1 | 1.3 |
| Cycle gas oil, vol. per cent | 36.7 | 53.2 | 40.4 | 55.3 |
| Knock rating, A. S. T. M. | 80.1 | 79.9 | 80.6 | 79.3 |

As above indicated, one of the characteristics of my aluminum fluosilicate catalyst is the high heat stability and I have discovered that aluminum fluosilicate imparts heat stability to other catalysts, particularly to magnesia-silica catalysts. The following data show the effect of adding 20% aluminum fluosilicate to a silica-magnesia catalyst containing about 22% to 25% of magnesia mixed with silica gel. The data given were obtained in the cracking of 35.5° A. P. I.

Mid-Continent gas oil at 925° F. and a space velocity of one volume of oil per hour per volume of catalyst.

| Catalyst | Gasoline produced in a 2-hr. period [1] | Total conversion in 1-hr. period [2] | | | |
|---|---|---|---|---|---|
| | | Initial | After heating 24 hours | | |
| | | | 1,200° F. | 1,300° F. | 1,400° F. |
| | | Percent | Percent | Percent | Percent |
| SiO₂(75%)-MgO(25%) | 45.9 | 65 | 66 | 63 | 21 |
| SiO₂-MgO(20%)-Al₂(SiF₆)₃ | 43.6 | 61 | 54 | 54 | 57 |

[1] 10 lb. Reid vapor pressure.
[2] The total conversions given are determined by subtracting from 100 the total percent recovered gas oil.

In preparing my catalyst I prefer to incorporate the aluminum fluosilicate in other hydrocarbon conversion catalysts, particularly the metal oxide gels such as silica gel, alumina gel or magnesia gel or combinations of them. Thus, I may thoroughly mix the aluminum fluosilicate with silica hydrogel prepared from sodium silicate solutions and an acid. Undesirable soluble salts should be washed from the hydrogel before mixing with the aluminum fluosilicate. Mixing may be accomplished by grinding in a ball mill to produce a very thorough intimate mixture. The amount of aluminum fluosilicate used in this way will ordinarily be about 5 to 25%.

In addition to the aluminum fluosilicate I may add to the silica hydrogel, magnesium oxide or aluminum oxide, preferably in an amount of about 1 to 30%. All three ingredients may be mixed simultaneously after which the gel mixture is dried, pelleted or graded to produce the desired granular catalyst or it may be ground to a fine powder where the catalyst is intended to be used as a suspension in the hydrocarbon vapors.

The alumina employed in preparing the mixed catalysts just described may be an alumina gel prepared by coagulation of alumina sol derived from the action of dilute acid on metallic aluminum or by the action of acid on sodium aluminate or other suitable salt. Alumina suitable for preparing a mixed catalyst as described above may also be prepared by treating an aqueous solution of a salt of aluminum such as aluminum sulfate with a base material. I prefer to employ in my catalyst fluosilicate of aluminum, but other fluosilicates may be employed such as magnesium, beryllium, cerium, and thorium fluosilicates, and in general, the fluosilicates of the metals of groups II, III and IV of the periodic system.

Although I have described my invention with respect to certain applications thereof, I intend that it be defined only by the following claims.

I claim:

1. The process of converting hydrocarbon oils into high knock rating motor fuels which comprises subjecting said oils at conversion temperatures to the action of a catalyst consisting essentially of magnesium oxide and aluminum fluosilicate.

2. The process of converting hydrocarbon oils into gasoline of high knock rating comprising subjecting said oils at conversion temperatures to the action of a solid catalyst comprising an intimate mixture of silica, magnesia and aluminum fluosilicate.

3. The process of claim 2 wherein said silica is a silica gel.

4. The process of claim 2 wherein said catalyst is prepared by thoroughly mixing aluminum fluosilicate and magnesia with silica hydrogel followed by drying and igniting the mixture.

5. The process of reforming low knock rating naphtha which comprises contacting the vapors of said naphtha at reforming temperature with a solid conversion catalyst comprising a mixture of active silica and magnesia promoted with aluminum fluosilicate.

6. The process of claim 5 wherein the catalyst contains about 5% to 50% of magnesia and about 1% to 25% of aluminum fluosilicate.

7. The process of claim 5 wherein hydrogen is added to said naphtha vapors in the presence of said catalyst.

8. The process of cracking heavy hydrocarbon oils which comprises contacting said oils with a catalyst comprising magnesium oxide and a fluosilicate of a metal selected from the class consisting of groups II, III and IV of the periodic system.

9. The process of converting hydrocarbon oils which comprises contacting said oils at conversion temperature with a catalyst comprising active silica and magnesia intimately mixed with a fluosilicate of a metal selected from the class consisting of groups II, III and IV of the periodic system.

10. A hydrocarbon conversion catalyst comprising magnesia and a solid, refractory, insoluble fluosilicate in intimate admixture therewith.

11. The process of converting hydrocarbon oils into high knock rating motor fuels which comprises subjecting said oils at conversion temperatures to the action of a catalyst consisting essentially of magnesia and a solid refractory insoluble fluosilicate in intimate admixture therewith.

JAMES C. BAILIE.